1

3,055,889
DICHLOROCYANURATE COMPLEX SALTS
Ronald W. Marek, Tonawanda, N.Y., assignor to Olin Mathieson Chemical Corporation, a corporation of Virginia
No Drawing. Filed Mar. 4, 1960, Ser. No. 12,677
6 Claims. (Cl. 260—242)

This invention relates to the preparation and use of novel complex compounds prepared by reacting an alkali or alkaline earth metal salt of dichlorocyanuric acid with a salt of cadmium, nickel or copper. The complexes contain available chlorine and are more stable than the dichlorocyanurates used in their preparation. Thus, the new compounds are useful for general bleaching of textiles and fabrics and disinfecting; as in the prevention of growth of fungi and algae in water cooling towers and swimming pools.

The novel compounds of this invention are prepared by reacting an alkali metal or alkaline earth metal dichlorocyanurate with a nickel, copper or cadmium salt. The reaction is started at a pH of about 4 to 7 in a solvent for the reactants such as water or aqueous acetone from which the product precipitates. The temperature and reactant concentrations are not critical except that enough of the reactants be used to exceed the solubility of the product to facilitate its recovery by filtration. Room temperature is most convenient. The pH should be on the acid side to prevent precipitation of the copper, cadmium or nickel oxides or hydroxides. After mixing the reactants, a brief stirring period, such as a few minutes to a half hour, facilitates precipitation of the complex compound.

The reactant ratios are not critical since the complex will form until the reactant present in lesser stoichiometric amount is consumed. For economy it is preferred to use about 0.5 to 20 equivalent weights of the dichlorocyanurate per equivalent weight of the nickel, copper or cadmium salt. The stoichiometric ratio appears to be 2 equivalent weights of the dichlorocyanurate per equivalent weight of the metal salt. When using lithium or magnesium dichlorocyanurates a ratio of about 10 to 20 equivalents of the dichlorocyanurate to each equivalent of the nickel, copper or cadmium salt should be used. Less than a ratio of about 10 to 1 results in substantial formation of the difficultly soluble simple dichlorocyanurates of the nickel, copper or cadmium. Although any combination of reactants mentioned will produce a complex product, certain combinations of reactants and solvents should be avoided. These will be apparent to any skilled chemist. As mentioned above, easily chlorinated or oxidizable liquids should not be used as the reaction medium. Furthermore, the formation of insoluble by-products can contaminate the product. Thus, for example, barium dichlorocyanurate should not be used if the copper, cadmium or nickel is introduced as the sulfate. Not only will the barium sulfate contaminate the desired complex product, but the yield of the latter will be considerably decreased because the barium is required in the complex molecule.

The structure of all of these complex compounds is believed to be of the form:

$$A_n(MZ_4) \cdot xH_2O$$

wherein A is the alkali or alkaline earth metal, n is 2 for the alkali metals and 1 for the alkaline earth metals, M is copper, cadmium or nickel and x is 0 to about 6 depending upon the nature of the various complexes. In the formula, Z is the dichlorocyanurate radical which has the formula $(C_3N_3O_3Cl_2)^-$ or, structurally:

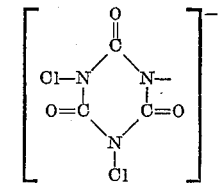

The salts of dichlorocyanuric acid are readily prepared by dissolving or suspending dichlorocyanuric acid or trichlorocyanuric acid or a mixture of the two in water or aqueous acetone and adding thereto a base such as sodium or potassium hydroxide. Weaker bases such as sodium acetate are also useful. At a pH of about 7 all of the dichlorocyanuric acid has been converted to the salt. The pH of the reaction mixture should not be allowed to exceed that at which the insoluble oxides of hydroxides of copper, cadmium or nickel will precipitate. A pH range of 4 to 7 is satisfactory for most reactions.

Although the invention has been described with dichlorocyanurates as a starting material, it is also possible to obtain the complexes of this invention by using trichlorocyanuric acid as a starting material. It is believed that a substantial portion of the trichlorocyanuric acid is converted to dichlorocyanurate during the reaction with the base. Monochlorocyanuric acid may exist in admixture with dichlorocyanuric acid and this mixture is also useful and within the scope of the term "reactants" of this invention.

The compounds of this invention are white, green, blue or varying shades of purple powders. They are soluble in water to the extent of from about 1 percent to 5 percent by weight.

The following examples illustrate several modes of preparation and the stability and use of these novel, complex compounds.

*Example 1*

One mole of sodium dichlorocyanurate was dissolved in 1200 grams of water and a solution containing one mole of cupric sulfate in 890 grams of water was added to it. The mixture was allowed to stand about 5 minutes and the precipitate was filtered off. It was washed with 100 grams of water and dried to constant weight at 55° C. The color of the precipitate was Periwinkle (A Dictionary of Color, Maerz and Rea Paul, McGraw-Hill and Co., Inc., 1950). The yield was 206 grams or 86% of material having the composition $Na_2[Cu(C_3N_3O_3Cl_2)_4]$. The analysis follows:

| Analysis | Percent | |
|---|---|---|
| | Theoretical | Found |
| Na | 5.1 | 5.0 |
| Cu | 7.1 | 7.4 |
| C | 16.1 | 16.5 |
| N | 18.7 | 17.8 |
| Cl$_2$ (available) | 63.3 | 61.0 |

*Example 2*

One-half mole of dichlorocyanuric acid was dissolved in 500 milliliters of acetone. To it was added a solution containing 2 moles of sodium acetate in 400 grams of water and then 0.25 mole of cupric sulfate in 323 grams of water. After 5 minutes the precipitate which formed was filtered off. It was washed with 50 milliliters of water and then with 50 milliliters of acetone. This product was dried at 55° C. to a constant weight of 95 grams. The available chlorine was 58.9% corresponding to the formula $Na_2[Cu(C_3N_3O_3Cl_2)_4]$.

*Example 3*

One tenth of a mole of trichlorocyanuric acid was dissolved in 100 milliliters of acetone. To this was added 0.4 mole of sodium acetate in 80 milliliters of water and .04 mole of cupric sulfate in 100 milliliters of water. The precipitate formed immediately. It was filtered off, washed with 50 milliliters of water and dried. The available chlorine was 61.2%.

*Example 4*

Two solutions, one containing 0.034 mole of calcium dichlorocyanurate in 300 milliliters of water and the other containing .017 mole of cupric sulfate in 25 milliliters of water, were mixed. The precipitate was filtered off, washed with water and dried. It contained 61.0% of available chlorine. Based on the formula $$Ca[Cu(C_3N_3O_3Cl_2)_4]$$

the copper content should be 7.1%. The copper found by analysis was 6.8% in good agreement with this formula.

*Example 5*

A solution of 0.72 mole of potassium dichlorocyanurate in 2000 milliliters of water was added to a solution of 0.53 mole of cupric sulfate in 448 grams of water. The precipitate was filtered off and dried. Its available chlorine content was 58.7% in good agreement with the theoretical value for the formula $K_2[Cu(C_3N_3O_3Cl_2)_4]$.

*Example 6*

In order to compare the stability of the compounds of this invention with simple metal salts of chlorocyanuric acids the compositions were placed in an oven at 250° C. for 15 minutes.

| No. | Description | Percent available chlorine | |
|---|---|---|---|
| | | Before | After |
| 1 | Sodium dichlorocyanurate | 60.0 | 27.7 |
| 2 | Complex prepared in Example 1 | 61.0 | 56.8 |
| 3 | Dichlorocyanuric acid | 68.8 | 14.2 |
| 4 | Complex prepared in Example 2 | 58.9 | 50.2 |
| 5 | Potassium dichlorocyanurate | 58.5 | 0.0 |
| 6 | Complex prepared in Example 5 | 58.7 | 55.4 |

The complex compounds of this invention are thus considerably more stable than the corresponding simple salts or the free dichlorocyanuric acid.

*Example 7*

The following experiment demonstrates the bleaching ability of several of the complex compounds of this invention. The performance of the simple calcium and sodium dichlorocyanurates were included for comparison. Each of the compounds listed below were dissolved in water to give a solution containing 200 parts per million of available chlorine. To each solution was added 2500 parts per million of a commercially available laundering detergent whose active ingredients were alkyl aryl sulfonate and tallow alcohol sulfate and 400 parts per million of sodium metasilicate as buffer. Sections of Indian Head cotton cloth which had been stained with aqueous tea solutions were placed in each bath for 8 minutes at 140° F. After this, they were rinsed in water and then in dilute acetic acid and the brightness, or light reflectancy, was measured by means of a Photovolt Brightness Meter. Two blanks are included to show the effect of water alone and water with detergent:

Composition: Brightness
    Water alone _____ 63
    Aqueous detergent _____ 65.5
    Aqueous detergent and sodium dichlorocyanurate _____ 86.5
    Aqueous detergent and calcium dichlorocyanurate _____ 85.0
    Aqueous detergent and cupric ion complex of—
        Sodium dichlorocyanurate _____ 84.5
        Potassium dichlorocyanurate _____ 86.0
        Calcium dichlorocyanurate _____ 87.5

The initial reflectancy of the tea-stained cloth was 55. Thus the complexes of this invention bleach as well as the simple dichlorocyanurates.

*Example 8*

A solution of 0.0195 mole of cadmium acetate in 25 milliliters of water was added to 200 milliliters of water containing 0.039 mole of potassium dichlorocyanurate. The solution was allowed to stand overnight. The next morning the white precipitate was removed and dried at 55° C. to constant weight. The yield was 53.2%. The available chlorine was 54.3% compared to the theoretical value of 57.9%, and the cadmium content was 11.3% compared to the theoretical value of 11.5% based on the formula:

$$K_2[Cd(C_3N_3O_3Cl_2)_4]$$

*Example 9*

A solution of 0.039 mole of potassium dichlorocyanurate in 200 milliliters of water was mixed with 25 milliliters of water containing 0.0195 moles of nickel chloride. The precipitate, very close to an Opaline Green color (A Dictionary of Color, Maerz and Rea Paul, McGraw-Hill and Co. Inc., 1950), was filtered off immediately, dried at 55° C. and analyzed. The yield was 55.3% of product which appeared to have the formula:

$$K_2[Ni(C_3N_3O_3Cl_2)_4] \cdot 6H_2O$$

| | Percent | |
|---|---|---|
| | Theoretical | Found |
| Available chlorine | 54.8 | 52.7 |
| Nickel | 5.68 | 5.62 |

*Example 10*

A solution of 0.0182 mole of barium dichlorocyanurate was admixed with 0.093 mole of cupric chloride. The air dried precipitate amounted to a 90% yield. It was Hortense V in color (A Dictionary of Color, Maerz and Rea Paul, McGraw-Hill Co. Inc., 1950) and analyzed:

| | Theoretical | Found |
|---|---|---|
| Ba | 13.91 | 12.88 |
| Cu | 6.43 | 6.65 |
| Available $Cl_2$ | 57.50 | 56.30 |

The theoretical is based on the formula $$Ba[Cu(C_3N_3O_3Cl_2)_4]$$

*Example 11*

A solution of 0.178 mole of lithium dichlorocyanurate in 98 milliliters of water was mixed with 25 milliliters of water containing 0.012 mole of cupric chloride. The precipitate was dried and appeared to correspond to the formula:

$$Li_2[Cu(C_3N_3O_3Cl)_4]$$

|  | Theoretical | Found |
|---|---|---|
| Cu | 7.3 | 7.0 |
| Available Cl$_2$ | 65.5 | 63.3 |

*Example 12*

In order to determine the stability of the complexes of this invention to moisture the following experiment was performed. Several of the complexes were spread on Petri dishes and these were placed in a humidity oven where the temperature was maintained at 80° F. and the relative humidity was 80%. The samples remained in the oven for 24 hours. The table below shows the available chlorine analysis for the complex compounds before and after the humidity test:

| Composition | Percent Available chlorine | |
|---|---|---|
|  | Before | After |
| Na$_2$[Cu(C$_3$N$_3$O$_3$Cl$_2$)$_4$] | 61.0 | 61.0 |
| K$_2$[Cu(C$_3$N$_3$O$_3$Cl$_2$)$_4$] | 58.7 | 58.7 |
| K$_2$[Cd(C$_3$N$_3$O$_3$Cl$_2$)$_4$] | 54.2 | 54.2 |
| Na$_2$[Cd(C$_3$N$_3$O$_3$Cl$_2$)$_4$] | 53.5 | 51.8 |
| K$_2$[Ni(C$_3$N$_3$O$_3$Cl$_2$)$_4$] | 51.8 | 51.7 |

The excellent stability to moisture of the complexes of this invention eliminates the necessity of dry storage. The latter is inconvenient and costly in the event of accidental exposure to moisture during shipping and storage after using part of the contents of the container.

What is claimed is:

1. A compound selected from the group consisting of compounds of the following formulas and hydrates thereof containing from 1 to 6 moles of water, inclusive:

$$A_2[M(C_3O_3N_3Cl_2)_4]$$

and $$A'[M(C_3O_3N_3Cl_2)_4]$$

wherein A is an alkali metal, and wherein A' is an alkaline earth metal, and wherein M is a metal selected from the group consisting of copper, cadmium and nickel, and wherein the radical $(C_3O_3N_3Cl_2)^-$ is the dichlorocyanurate radical.

2. The compound of the formula $$Na_2[Cu(C_3O_3N_3Cl_2)_4]$$

wherein the radical $(C_3O_3N_3Cl_2)^-$ is the dichlorocyanurate radical.

3. The compound of the formula Ca[Cu(C$_3$O$_3$N$_3$Cl$_2$)$_4$] wherein the radical $(C_3O_3N_3Cl_2)^-$ is the dichlorocyanurate radical.

4. The compound of the formula $$Na_2[Cd(C_3O_3N_3Cl_2)_4]$$

wherein the radical $(C_3O_3N_3Cl_2)^-$ is the dichlorocyanurate radical.

5. The compound of the formula $$K_2[Cu(C_3O_3N_3Cl_2)_4]$$

wherein the radical $(C_3O_3N_3Cl_2)^-$ is the dichlorocyanurate radical.

6. The compound of the formula K$_2$[Ni(C$_3$O$_3$N$_3$Cl$_2$)$_4$] wherein the radical $(C_3O_3N_3Cl_2)^-$ is the dichlorocyanurate radical.

References Cited in the file of this patent

UNITED STATES PATENTS 2,913,460    Brown et al. _____ Nov. 17, 1959

FOREIGN PATENTS 1,149,758    France _____ July 22, 1957

OTHER REFERENCES

Ley et al.: Ber. d. deutsche Chem. Ges., vol. 46, part 3, pages 4048 to 4049 (1913).

Chemical Abstracts, vol. 8, pages 930–931 (1914).

Ostrogovich et al.: Atti Conr. nasl. chim. pura applicata, Rome, Pt. 1, pages 431–436 (1936).